Patented Feb. 12, 1935

1,990,483

UNITED STATES PATENT OFFICE 1,990,483

CHEMICAL COMPOUND AND PROCESS OF MAKING SAME

George De Witt Graves, Wilmington, Del., assignor to E. I. du Pont de Nemours & Company, Wilmington, Del., a corporation of Delaware No Drawing. Application April 20, 1933, Serial No. 667,041

14 Claims. (Cl. 260—101)

This invention relates to the preparation of mixed esters of polyhydric alcohols with a plurality of acids and more particularly to the preparation of cellulose mixed esters.

Numerous methods of preparing mixed esters have been proposed. Clarke and Malm (U. S. Patent 1,735,159) disclose a process of reacting a fatty acid anhydride upon a monocarboxylic acid having more carbon atoms than the acid from which the anhydride is derived, removing from the mass the acid formed in the reaction and then esterifying cellulose with the reaction mass. The same inventor in U. S. Patent 1,698,048, discloses a process for the preparation of cellulose acetic esters containing higher acyl groups comprising treating partially deacetylated cellulose acetate with an acid anhydride which impels esterification together with a substance such as a higher carboxylic acid which furnishes the higher acyl groups. British Patent 356,665 and French Patent 691,031 disclose a process of esterifying cellulose with a fatty acid anhydride in combination with an aliphatic acid which is different from that corresponding to the acid anhydride.

This invention has an object the preparation of polyhydric alcohol mixed esters, the acid radicals of which comprise acetyl. A further object is the preparation of cellulose derivatives esterified with a plurality of acids comprising acetic acid. A still further object is a process in which ketene is utilized as an acetylating agent in the preparation of acetic esters of polyhydric alcohols. Other objects will appear hereinafter.

These objects are accomplished by the following invention, wherein a polyhydric alcohol is esterified by means of ketene in the presence of one or more organic carboxylic acids, at least one of which is an acid other than acetic acid, in the presence or absence of catalysts for the esterification and/or diluents or solvents for the polyhydric alcohol ester produced.

The invention is exemplified in the following examples wherein quantities of materials are expressed as parts by weight.

Example 1

One hundred parts of air-dry cotton linters are mixed thoroughly with 600 parts of propionic acid containing three parts of concentrated sulfuric acid in a closed container at 20–25° C. Ketene (80–100 parts) is passed into the container until the esterification is complete, as shown by the complete solution of the cellulose in the reaction mixture. The temperature of the reaction mass gradually increases during the addition of the ketene but is held below a maximum of 45–50° C. by suitable external cooling. The primary acetate-propionate thus formed may be precipitated in water at this stage or may be hydrolyzed to the desired acyl content by any of the ordinary methods.

Example 2

Twenty parts of oven-dry cotton linters are rapidly mixed with 100 parts of anhydrous hydrofluoric acid and 80 parts of n-butyric acid at 0° C. in a closed container. Ketene is then passed into the reaction mixture, which is agitated continuously, until the esterification is complete. The temperature of the reaction mixture is kept below 25° C. by any suitable means of cooling the reaction vessel. The clear esterification solution is poured into water to precipitate the cellulose acetate-butyrate, which is soluble in chloroform, ethyl acetate-alcohol mixtures, and benzene-alcohol mixtures. The solubility characteristics may be altered by submitting the primary ester to a partial hydrolysis by any of the ordinary methods.

Example 3

Five parts of oven-dry cotton linters are mixed with 25 parts of anhydrous hydrofluoric acid and 14 parts of pyruvic acid at 0° C. Ketene is passed into the mixture which is held at 0° for a few minutes and allowed to react with no further external cooling until a smooth viscous solution is obtained. The primary cellulose acetate-pyruvate obtained by this process is soluble in acetone and in chloroform.

Example 4

One hundred parts of air-dry cotton linters are mixed with 500 parts of propionic acid, 100 parts of coconut oil fatty acids and four parts of concentrated sulfuric acid at 20–25° C. for one to two hours in a closed container. Ketene (about 100 parts) is then passed into the reaction mixture and the esterification proceeds in the same manner as that described in Example 1. The resulting cellulose ester of acetic, propionic, and coconut oil fatty acids may be precipitated directly or may be partially hydrolyzed.

Example 5

Twenty-five parts of monoethyl cellulose is treated with a mixture of 125 parts of propionic acid and two parts of concentrated sulfuric acid.

Twenty parts of ketene is then passed into this solution with continuous stirring and the reaction temperature maintained between 20–45° C. After all the ketene has been introduced the esterification solution may be poured into water directly or allowed to stand until the desired viscosity has been reached, and then precipitated in the usual manner.

*Example 6*

One hundred parts of cotton linters are mixed with 500 parts of 85% formic acid and allowed to stand at room temperature for 12–24 hours. The excess formic acid is removed by centrifuging and after washing acid-free the linters are dried rapidly at about 65° C. These pretreated linters are then esterified by ketene in the presence of propionic acid in the same manner as described in Example 1. The primary formate-acetate-propionate may be isolated directly or given any desired degree of hydrolysis This esterification process is advantageous as a general method for the preparation of mixed esters of polyhydroxy compounds such as sorbitol, glycerol, glucamine, pentaerythritol, inositol, quebrachitol, and carbohydrates such as starches and sugars, e. g., glucose, etc.

As examples of esters that can be made by this process, may be cited the mixed esters of polyhydroxy compounds with acetic and at least one of the following acids:

Formic, propionic, butyric, valeric, caproic, heptoic, lauric, stearic, oleic, palmitic, erucic, linoleic, pyruvic, levulinic, acrylic, crotonic, isovaleric, benzoic, naphthoic, toluic, furoic, chlorobenzoic, picolinic, phenylacetic, cinnamic, linseed oil acids, China-wood oil acids, cottonseed oil acids, and fatty oil acids generally. Not all of these acids are equally suitable in the process of the present invention. Those of lower esterification rate yield mixed esters containing proportionately more acetyl radicals than do those of higher esterification rate. This is particularly true in the esterification of cellulosic materials which, as is well known, usually require more drastic esterification conditions. Because of this difference in rate of esterification and because of the properties of the resulting esters aliphatic acids are preferred to aromatic and heterocyclic. Further, aliphatic acids containing the grouping —$CH_2COOH$, i. e. containing no negative substituents on the carbon alpha to the hydroxyl group, are definitely preferred. Fatty acids and particularly those of 3 to 10 carbon atoms represent the most preferred acids although keto acids such as pyruvic and levulinic may be used. By fatty acid is meant any acyclic acid of the formula R-COOH wherein R is an acyclic monovalent hydrocarbon radical. Above about ten carbon atoms the rate of esterification of the polyhydroxy compound by the fatty acid lessens so that a greater proportion of acetyl is introduced.

Saturated acids are preferred although unsaturated acids are in general practically as effective. In the case of crystalline acids an inert diluent such as dioxane or ethylene dichloride should be used. The diluent should preferably be one which is a solvent for the solid acid used.

The cellulosic material which may be used in this process is not limited to cotton linters. Any other cellulosic material such as purified wood pulp, bagasse pulp, etc., may be used. Likewise, various pretreated celluloses, low substituted celluloses, etc., may be used; for example, cellulose derivatives such as ethyl cellulose, benzyl cellulose, crotyl cellulose and other cellulose ethers, cellulose acetate, cellulose nitrate, and other cellulose esters, may be employed in this process providing the cellulose derivative is not so highly substituted as to prevent reaction of the derivative with a plurality of acid radicals. Low-substituted glycol cellulose (e. g. that containing about one hydroxyethyl group to 4 glucose units) is also suitable.

The proportions of the different acid radicals present in these cellulose mixed esters may be varied over wide limits by varying the proportions of the various acids in the esterification bath. If a cellulose ester with a very high percentage of acetic acid is desired, acetic acid may be added to the esterification mixture together with the other acids.

While mixed esters of cellulose with nitric and acetic acids may be made, e. g., an ester containing 0.7% acetyl and 9.8% nitrogen by reacting cotton linters with ketene in the presence of 92% nitric acid to which acetic anhydride had been added to react with all of the water, the slight degree of acetylation and the irreproducibility of results cause this to represent a less preferred embodiment of the invention.

The esterification may be conducted in the presence or absence of a diluent. If a fibrous cellulose ester is desired the esterification may be conducted in the presence of a liquid which is a non-solvent for the cellulose ester produced; examples of such non-solvents are benzene, toluene and carbontetrachloride. The esterfication can also be conducted in the presence of a solvent for the cellulose mixed ester produced, such as chloroform, ethylene dichloride, liquid sulfurdioxide, dioxane, etc.; these diluents do not result in fibrous esters.

As indicated in the examples, the catalyst used in this esterification process may be any known catalyst or condensing agent which has hitherto been used in the esterification of cellulose or other polyhydroxy compound. Among these catalysts are sulfuric acid, hydrofluoric acid, perchloric acid, zinc chloride, and benzenesulfonic acid.

The cellulose mixed esters produced according to this process may be used for any of the processes for which cellulose esters are now used, such as for lacquers or other coating compositions, films, artificial fibers, plastics, in the manufacture of safety glass and the like. The polyhydric alcohol mixed esters likewise are valuable adhesives and plasticizers, and are suitable for coating and impregnating compositions, especially in combination with oils, waxes, cellulose derivatives, natural and synthetic resins, etc.

This invention affords a simplified procedure for the preparation of mixed ester of polyhydric alcohols and particularly of mixed cellulose esters of excellent quality which process results in a low manufacturing cost of the ester produced. Previous methods of preparing cellulose mixed esters by treating cellulose with acetic anhydride in the presence of higher acids or by treating cellulose esters with mixtures of acids or by esterifying an incompletely substituted cellulose ester by an organic acid anhydride, are disadvantageous because of the number of steps required. The process of the present invention is rapid, convenient and easy, eliminating in general all steps but that of esterification. Thus it is not necessary to prepare the anhydrides of higher molecular weight acids, which are often difficult to obtain, nor is it necessary to prepare and isolate a cellulose ester previous to re-esterification.

As many apparent and widely different embodiments of this invention may be made without departing from the spirit thereof, it is to be understood that I do not limit myself to the foregoing examples or description except as indicated in the following claims.

I claim:

1. A process for the preparation of mixed esters of polyhydric alcohols which comprises reacting the polyhydric alcohol with ketene and an organic acid other than acetic acid.

2. A process for the preparation of mixed esters of cellulose, comprising reacting a substance having the cellulosic nucleus and containing free hydroxyl groups, with ketene and an organic acid other than acetic acid.

3. A process for the preparation of mixed esters of cellulose comprising reacting cellulose with ketene and an organic acid other than acetic acid.

4. A process for the preparation of mixed esters of cellulose comprising reacting cellulose with ketene and a monabasic organic acid other than acetic acid.

5. A process for the preparation of mixed esters of cellulose comprising reacting cellulose with ketene and an aliphatic monobasic acid other than acetic acid.

6. A process for the preparation of mixed esters of cellulose comprising reacting cellulose with ketene and a fatty acid other than acetic acid.

7. A process for the preparation of mixed esters of cellulose comprising reacting cellulose with ketene and a fatty acid of at least three carbon atoms.

8. A process for the preparation of mixed cellulose esters comprising reacting cellulose with ketene and a fatty acid of at least three carbon atoms in the presence of a diluent.

9. A process for the preparation of mixed cellulose esters which comprises reacting cellulose with ketene and a fatty acid of at least three carbon atoms in the presence of a diluent which is a solvent for the mixed cellulose esters.

10. A process for the preparation of mixed cellulose esters comprising reacting cellulose with ketene and a fatty acid of at least three carbon atoms in the presence of an acid catalyst.

11. A process for the preparation of mixed esters of cellulose comprising reacting cellulose with ketene and a fatty acid of from three to ten carbon atoms.

12. A process for the preparation of mixed esters of cellulose comprising reacting cellulose with ketene and a saturated fatty acid of from three to ten carbon atoms.

13. A process for the preparation of mixed esters of cellulose comprising reacting cellulose with ketene and a saturated fatty acid of from three to ten carbon atoms and having the grouping $CH_2COOH$.

14. A process for the preparation of mixed cellulose esters which comprises reacting cellulose with ketene and propionic acid.

GEORGE DE WITT GRAVES.